US010769828B2

(12) United States Patent
Malle (10) Patent No.: US 10,769,828 B2
(45) Date of Patent: Sep. 8, 2020

(54) AUTOMATED PHOTO COLLAGES

(71) Applicant: Nimai C. Malle, Austin, TX (US)

(72) Inventor: Nimai C. Malle, Austin, TX (US)

(73) Assignee: Nimai C. Malle, Austin, TX (US)

( * ) Notice: Subject to any disclaimer, the term of this patent is extended or adjusted under 35 U.S.C. 154(b) by 122 days.

(21) Appl. No.: 16/034,605

(22) Filed: Jul. 13, 2018

(65) Prior Publication Data

US 2019/0019319 A1    Jan. 17, 2019

Related U.S. Application Data

(60) Provisional application No. 62/532,174, filed on Jul. 13, 2017.

(51) Int. Cl.
*G06T 11/60* (2006.01)
*G06K 9/00* (2006.01)

(52) U.S. Cl.
CPC .......... *G06T 11/60* (2013.01); *G06K 9/00228* (2013.01); *G06K 9/00288* (2013.01)

(58) Field of Classification Search
CPC . G06T 11/60; G06K 9/00228; G06K 9/00288
See application file for complete search history.

(56) References Cited

U.S. PATENT DOCUMENTS

| 8,457,442 B1* | 6/2013 | Wang | G06K 9/00 382/285 |
| 8,543,940 B2* | 9/2013 | Singhal | G06F 3/0482 382/284 |
| 8,660,319 B2* | 2/2014 | Aarabi | G06K 9/00228 382/100 |
| 9,064,348 B2* | 6/2015 | Ahn | G06T 11/60 |
| 9,836,864 B2* | 12/2017 | Funabashi | G06T 11/60 |
| 2004/0120009 A1* | 6/2004 | White | G06T 11/60 358/1.18 |
| 2012/0314912 A1* | 12/2012 | Nakagomi | G06Q 50/01 382/115 |
| 2015/0131872 A1* | 5/2015 | Ganong | G06K 9/00677 382/118 |
| 2017/0019590 A1* | 1/2017 | Nakamura | G06K 9/00255 |
| 2017/0351906 A1* | 12/2017 | Oguchi | G06K 9/00268 |
| 2018/0348857 A1* | 12/2018 | Chen | G06F 3/0482 |

OTHER PUBLICATIONS

Automatic cropping; http://cloudinary.com/documentation/image_transformations?procotol=http#face_detection_based_transformations, 11 pages, Jul. 13, 2018.

* cited by examiner

*Primary Examiner* — Nizar N Sivji
(74) *Attorney, Agent, or Firm* — Kowert, Hood, Munyon, Rankin & Goetzel, P.C.; Lawrence J. Merkel (57) ABSTRACT

In an embodiment, an automated process for generating photo collages including an individual photo of each member of a group, team, etc. with head shots of some or all members is provided. Various members or photographers may take digital photos of each member, capturing a full or partial body photo. The process may use face detection techniques to identify the faces in the body photos, and to automatically crop the head shots from the full body photos. The head shots may be cropped in a consistent manner, leading to a visually pleasing set of head shots in the collage. The effort required of the individuals tasked with producing the collages may be substantially reduced, in some embodiments. Additionally, the quality of the resulting collages may be improved, in some embodiments.

20 Claims, 9 Drawing Sheets

AUTOMATED PHOTO COLLAGES

This application claims benefit of priority to U.S. Provisional Patent Application Ser. No. 62/532,174, filed on Jul. 13, 2017. The above application is incorporated herein by reference in its entirety.

BACKGROUND

Technical Field

Embodiments described herein are related to an automated process for generating photo collages from photos of individuals.

Description of the Related Art

Individuals often gather in various groups/organizations to participate in a common interest. For example, the individuals may join a sports team to compete in that sport. The individuals may join a club for a hobby or other interest in order to learn from one another, to socialize together, etc. There are many types of groups/organizations with which individuals get involved.

Often, the individuals would like to have photographs (more briefly, "photos") to commemorate the season, a year in the club or other organization, an event held by the club/organization, etc. In many cases, a photographic keepsake for organization members is provided. The keepsake can include an individual photo and a group photo laid out on a single sheet. The sheet can also include other information such as the group name, a logo, season or event information, etc. The photo of the given individual may typically be a full body shot or partial body shot.

The group photo portion of the keepsake can be problematic for various reasons. For example, members can join or leave over the course of the season, one or more members may not be fully visible in the back of the group, some members looking away from the camera or blinking when the group photo is taken, finding a time when all members are present for the group photo may be difficult, etc. Additionally, differences in lighting, camera type, etc. when various users take photos of various members may result in noticeable differences in color, exposure, resolution, etc. in each photo. Such differences may be onerous for the individuals making the keepsakes to resolve.

SUMMARY

In an embodiment, an automated process for generating the photo collage keepsakes including an individual photo and head shots of the members of a group, team, etc. is provided. Members themselves or photographer(s) may take digital photos of each member, capturing a full or partial body photo. The process may use face detection techniques to identify the faces in the full body photos, and to automatically crop the head shots from the full body photos. The head shots may be cropped in a consistent manner, leading to a visually pleasing set of head shots in the collage. The effort required of the individuals tasked with producing the collages may be substantially reduced, in some embodiments. Additionally, the quality of the resulting collages may be improved, in some embodiments.

BRIEF DESCRIPTION OF THE DRAWINGS

The following detailed description makes reference to the accompanying drawings, which are now briefly described.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Figure 1:
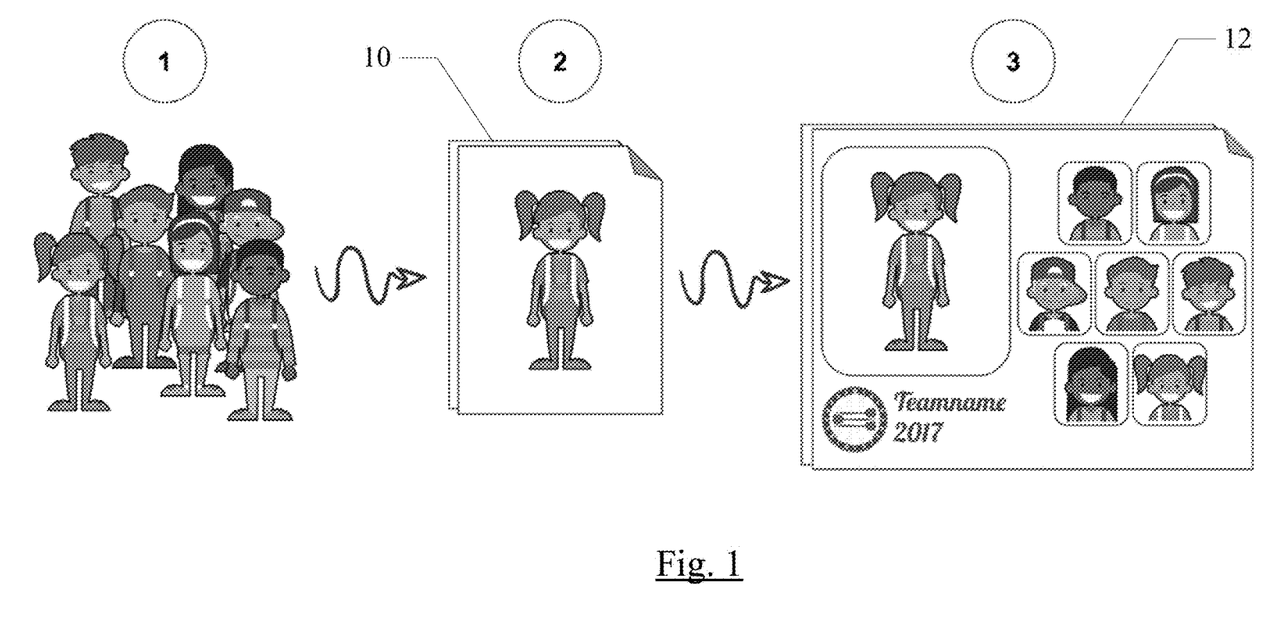
FIG. 1 is a block diagram illustrating one embodiment of the process at a high level.

Turning now to FIG. 1, a block diagram illustrating a process according to the present disclosure is shown at a high level. The process may be used with any group of people (e.g. a team, a club, a group of hobbyists, etc.). The process may be used to commemorate, e.g., a season for a team or other organization the gathers a group for a defined period of time. The process may also be used to commemorate a particular event, such as a fundraiser, an annual party, a trip, etc.

The process may include capturing an individual digital photo for each member of the group (reference numeral 10). The members need not have their photos taken at the same time, or even at the same place. Different cameras may be used, including cameras on cell phones and other portable electronic devices, as well dedicated camera devices (e.g. devices which function only as a camera, possibly with networking functionality to allow for offload of captured pictures). Digital photos may be used so that they may be transmitted and received between computing devices that may implement the automated processing described herein. It is also contemplated that more than one member may be included in an "individual" photo. For example, couples may be captured together in an "individual" photo. Parent/child photos may be used. Family photos may be used. Any subgroup of individuals may be used in an "individual" photo, in some embodiments, and the faces in the photo may be detected and cropped to head shots.

The member individual photo may be a "full body photo/shot," meaning that the photo captures significantly more of the member's body than just the head. The photo may capture all of the member (e.g. head to foot), or ¾ of the member, or even ½ of the member (including the head each time, however). Thus, the member photo will be referred to herein as a body shot/photo.

A photo collage may be defined by a designated individual or individuals in the organization (e.g. the individual or individuals who volunteer for the duty). The individual need not necessarily be a member of the group that is memorialized by the photo collage. The designated individual or individuals are referred to herein as the "selected user."

The selected user may define the format of the photo collage, including details such as the placement of the individual member photo, the set of member head shots, and any other content on the collage such as a team name, event title, organization/team logo, name of individual, names of members in the set of head shots, etc. The selected user may also review the head shots and/or the final photo collage prior to transmitting the collages for printing (or for electronic delivery, if the organization chooses to use electronic delivery instead of printing the results). An example of the final collage is illustrated at reference numeral 12 in FIG. 1. There may be one final collage for each member, having that member's individual body photo on it. The set of members in the head shots section may include that member, or may be the other members exclusive of that member, in various embodiments.

The head shots may be captured from the body photos automatically. Particularly, one or more face detection techniques may be applied to the body photos to locate the faces in the photos, and the photos may be automatically cropped to the head shot. Any face detection tool may be used. For example, in an embodiment, various freely available tools downloadable from the Internet may be used. One example available at the time of filing is at trackingjs.com. Other examples that may be used in other embodiments. Any face detection algorithm or combination of algorithms may be used, such as Viola-Jones, convolution mechanisms, binary robust independent elementary features (BRIEF)-based mechanisms, features from accelerated segment test (FAST)-based mechanisms, etc. Solutions based on Cloudinary (cloudinary.com) may be used.

Figure 2:
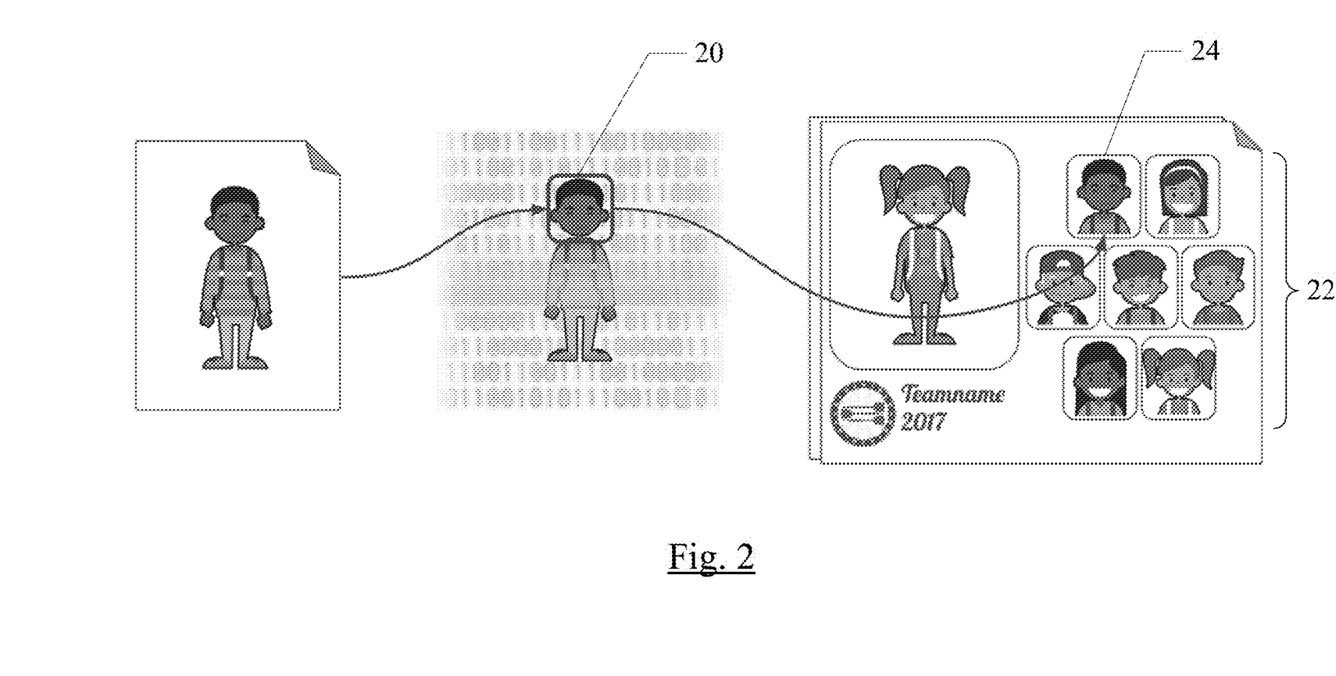
FIG. 2 is a block diagram illustrating one embodiment of automatic head shot cropping and collage generation.

In an embodiment, once the face is located using face detection, the face may be automatically cropped. FIG. 2 is an example of one embodiment of detecting the face and automatically cropping to the face (reference numeral 20). The same cropping may be used for each photo (e.g. the same aspect ratio for the head shot, and aligning the eyes at the same vertical location in head shot). For the eye alignment, it is possible that the member's head is tilted (accidentally or even purposefully) to one side or the other, so the eye alignment may be applied to the center of a line between the pupils. Viewed in another way, the eye alignment may be applied to an average of the vertical location of the eyes, to account for head tilting. In an embodiment, the aspect ratio and eye alignment may be specified as part of the overall photo collage definition, by the selected user.

In one embodiment, the same settings for automated cropping are applied to each photo, producing a substantially uniform result across the set of photos. As compared to manually cropping the photos, in which a user's judgement is involved in each individual crop, the uniformity of the automated cropping may be higher and therefore the final result may be more pleasing and of a higher quality. Additionally, the effort required from the selected user may be substantially reduced while producing a higher quality result.

The set of automatically-cropped head shots may be arranged to form the set of member photos 22 on each collage. For example, the automatically-cropped head shot 20 may be placed in location 24 of the collage. The order of members in the head shot area may be any order in various embodiments. In some embodiments, the order may be specified by the user. Exemplary orders may include alphabetical by last name, alphabetical by first name, random, order according to position (e.g. on a team, or within a group if the group has an organizational structure), explicit manual order, etc.

Figure 3:
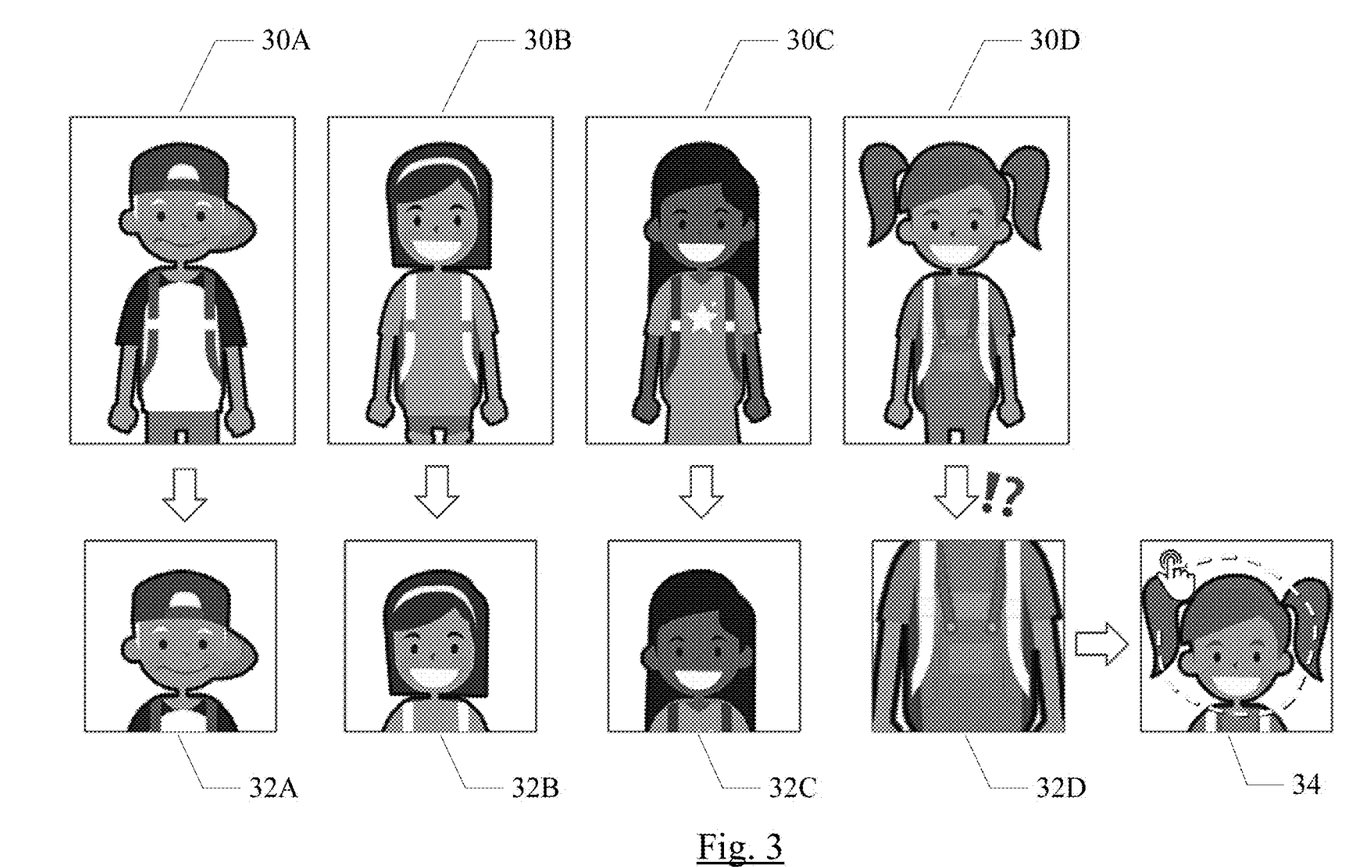
FIG. 3 is a block diagram illustrating one embodiment of user correction of an occasional error in face detection.

While face detection can be a highly accurate tool, the tool may occasionally have a face detection error (e.g. another part of the photo is identified as the face and the head shot does not include the head, or not all of the head). FIG. 3 is an example of four body shots 30A-30D, and corresponding head shots 32A-32D. The head shots 32A-32C have been properly captured by the face detection, but the head shot 32D has improperly captured a portion of the individual's body. In this case, the decoration on the clothing may bear a resemblance to a face (e.g. the buttons may be similar to eyes). In other cases, the face detection may identify a portion of the background of the photo as a face, for similar reasons. The selected user may review the head shots, and may correct any mis-identified faces (e.g. by indicating the area for the face detection tool to search for a face (e.g. reference numeral 34 in FIG. 3). Other embodiments may permit the user to identify the eyes and nose, for example, on the face and face detection may proceed within the identified area. The automated cropping process noted above may be applied to the user-identified face, improving the uniformity of the result over a manual cropping process.

Figure 4:
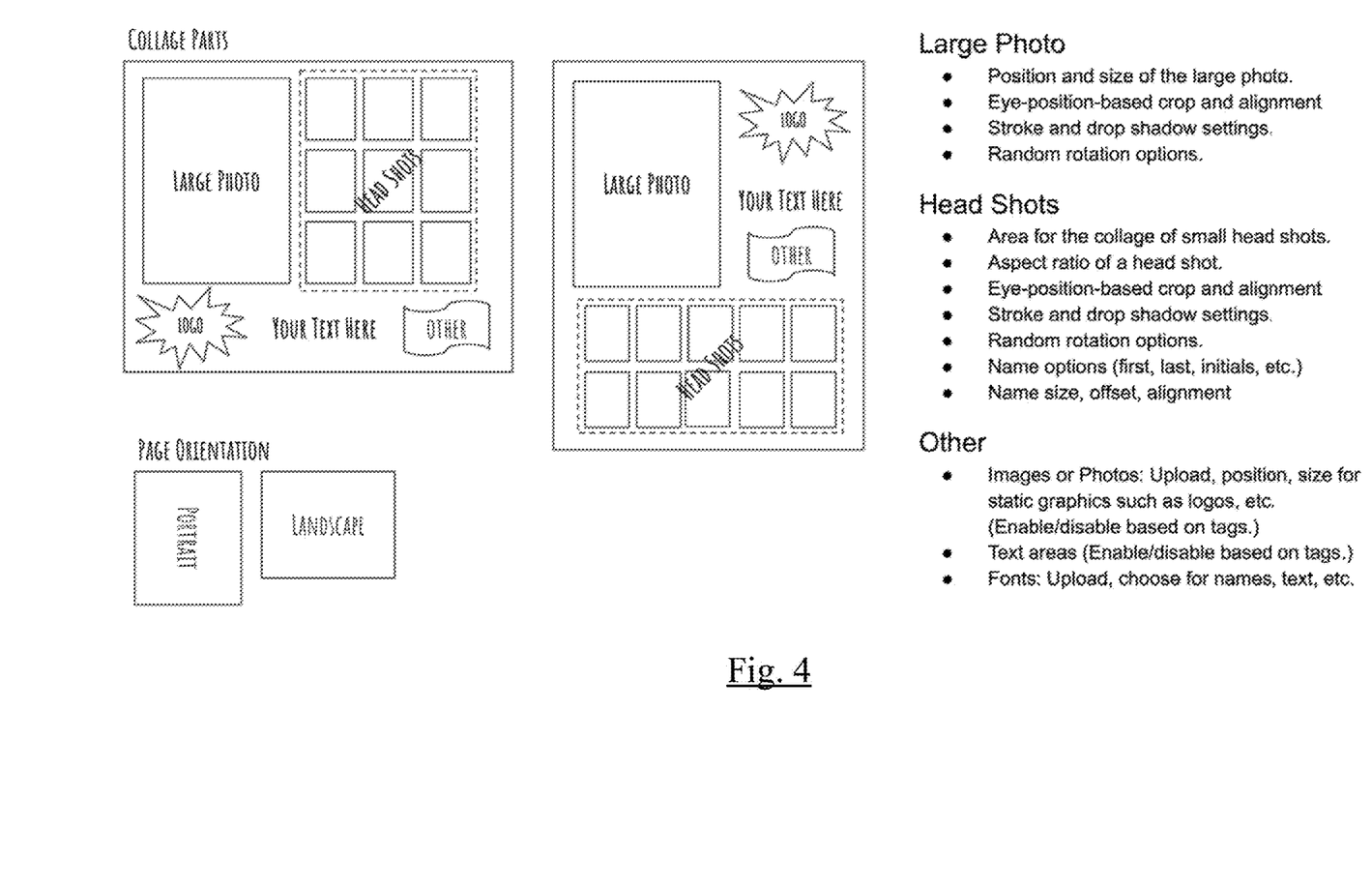
FIG. 4 is a block diagram illustrating one embodiment of formats for the collages and user-selectable controls to define a collage.

The automated collage process described herein may permit a variety of customizations, in various embodiments. For example, FIG. 4 illustrates an embodiment of various options. The page orientation may be specified as portrait or landscape, and the area for the large photo, head shots, and other information may be selected. The large photo may be defined by position (on the page) and size. Stroke and drop shadow settings may be supported. Stroke may refer to border definition, which may be applied outside, inside or on the border of each photo, for example. The stroke may be a dark line or any line style such as dotted, dashed, dotted and dashed, etc. The drop shadow may refer to a shadow placed underneath the image. Drop shadow transformation may include multiple transform operations, such as offsetting a copy of image, blurring the copy, removing the original color information and replacing it with a desired background color such as black, layering the images, etc. Random rotation options may be supported, in which each image is rotated by a small amount to improve the visual aesthetic while supporting a generally regular layout of the photos. Such an effect is difficult to produce manually but may be automated to provide a higher quality result. Color, texture, or image choices for the background may be supported, in some embodiments. Any desired customizations may be supported, in various embodiments, or no customizations to simplify the interface may be used. The head shot specifications may include an area for the head shots, aspect ratio and eye position-based crop and alignment options, stroke and drop shadow settings, random rotation options, options for each member's name (e.g. first name, last name, both first and last name, initials, etc.). Name size, offset, and alignment to the corresponding head shot may be specified. In some embodiments, ordering options for the head shots may be configurable as well, with various types as mentioned previously (e.g. various alphabetical options, random, explicit manual ordering, etc. Other options that may be specified may include various static graphics/photos such as logos, static text, fonts for the text, etc. Any combination of customizations may be supported, in various embodiments.

It is noted that, in an embodiment, it may be desirable to have a fairly consistent portion of the body captured. To do so, a user application that may be downloaded to a given user device, as discussed below, may display an overlay of the desired body capture on the screen that displays the image that will be captured when the camera button is pressed. The overlay may improve the consistency of the original photos uploaded to the collage generation module, which may simplify the capture of the images by the users and improve the uniformity and consistency of the resulting collages.

Figure 5:
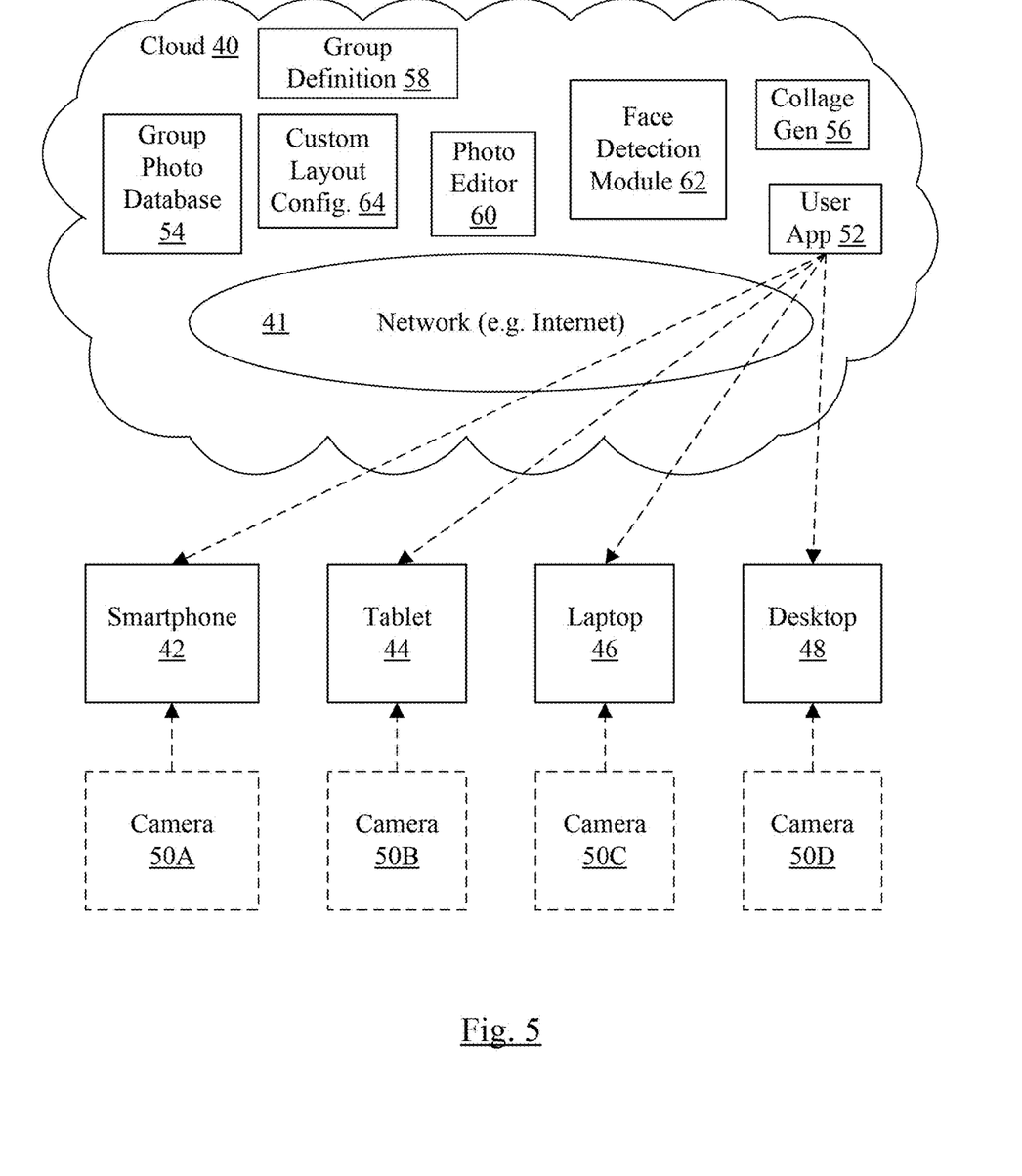
FIG. 5 is a block diagram illustrating one embodiment of a system for automatic generation of collages, including user download of an application.

FIG. 5 is a block diagram of one embodiment of a system that may employ the process described above. In the illustrated embodiment, much of the system may be employed in the "cloud," a term referring to a variety of resources that may be accessible over a network of some type, but the structure and location of resources may not be specifically known by the user. Accordingly, the cloud 40 in FIG. 5 may include a network 41, which may include the Internet as well as various local area networks that couple to the internet and couple to the user devices and/or computing devices in the cloud 40. The network may include wired networking, wireless networking, and combinations thereof.

Various user devices may be used by the members of the group, including smartphones that have an embedded camera that may be used to capture member photos (reference numeral 42), tablet computers, which may have an embedded camera as well (reference numeral 44), laptop computers, which may have an embedded camera but which is not likely to be used to capture member photos as it may be unwieldy (reference numeral 46), and desktop computers (reference numeral 48). Optionally, one or more of the user devices may be coupled to an external dedicated camera (reference numerals 50A-50D) or a memory card may be removed from the camera and inserted in the user device.

The user devices may download a user application 52 from the cloud 40 (illustrated by the dashed lines in FIG. 5). The user application 52 may be used to capture member body photos, tag the photos with the member's name and optionally other metadata (e.g. name of group, name of any subgroup within the group, position on a team, age group for multi-age groups, etc.). The user application 52 may transmit the tagged photos to the cloud 40 for storage and further processing to form the photo collages. For example, the cloud 40 may include a group photo database 54 to store the group photos. Additional components illustrated in the embodiment of FIG. 5 may include a collage generator module 56 (more briefly "collage generator 56"), a group definition database 58, a custom layout configuration data structure 64, a photo editor module 60 (more briefly, "photo editor 60"), and a face detection module 62. The collage generator 56, the photo editor 60, and the face detection module 62 may be programs executable in the cloud 40 (e.g. on various application servers in the cloud). The group photo database 54, the group definition database 58, and the custom layout configuration data structure 64 may be data structures resident on or more file servers or network attached storage devices in the cloud 40.

Figure 6:
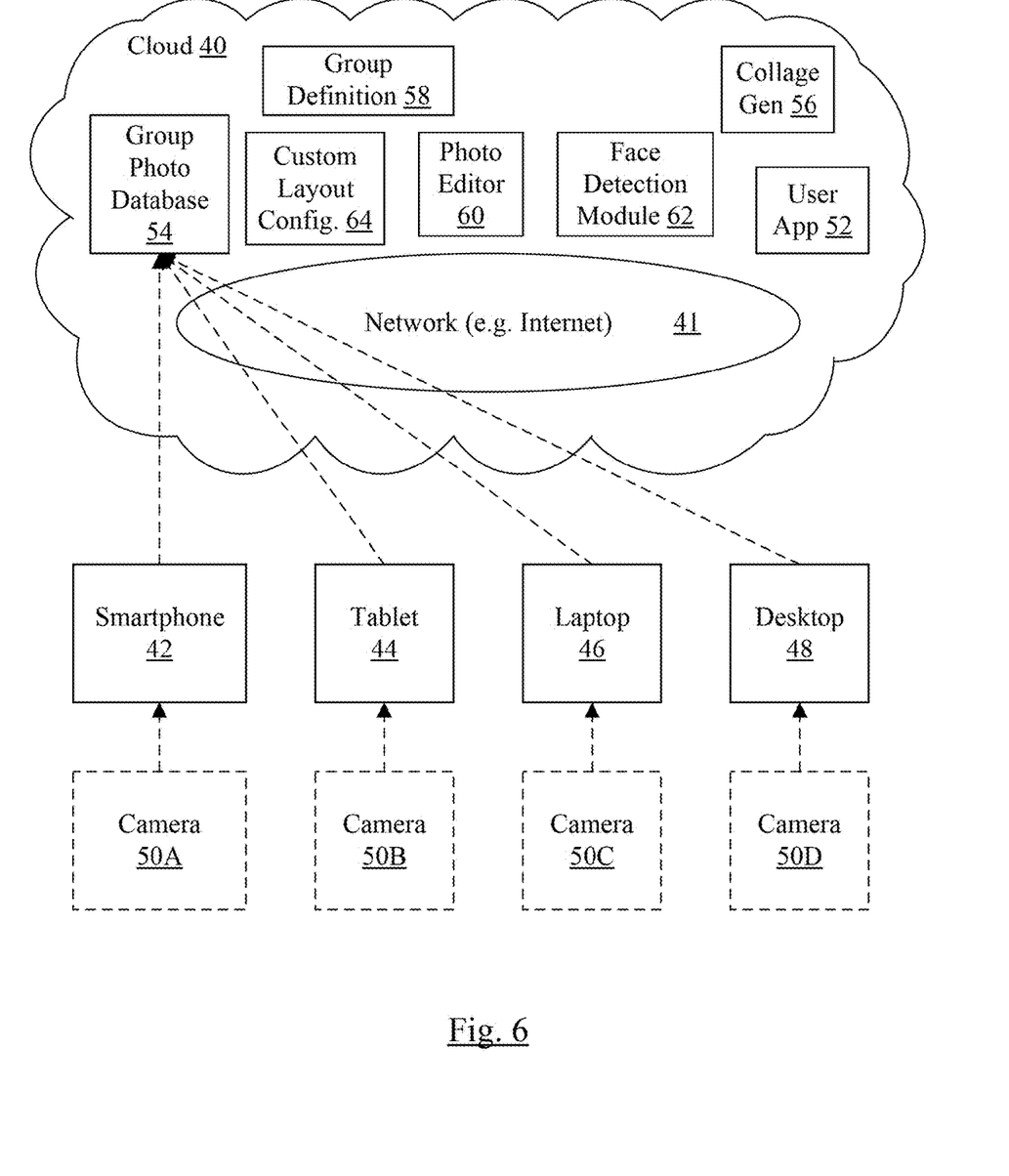
FIG. 6 is a block diagram illustrating one embodiment of the system for automatic generation of collages, including user upload of photos.

FIG. 6 is a block diagram of the system shown in FIG. 5, illustrating the uploading of member photos from the various user devices (e.g. via execution of the user application 52) to the group photo database 54, illustrated by the dotted lines in FIG. 6.

Figure 7:
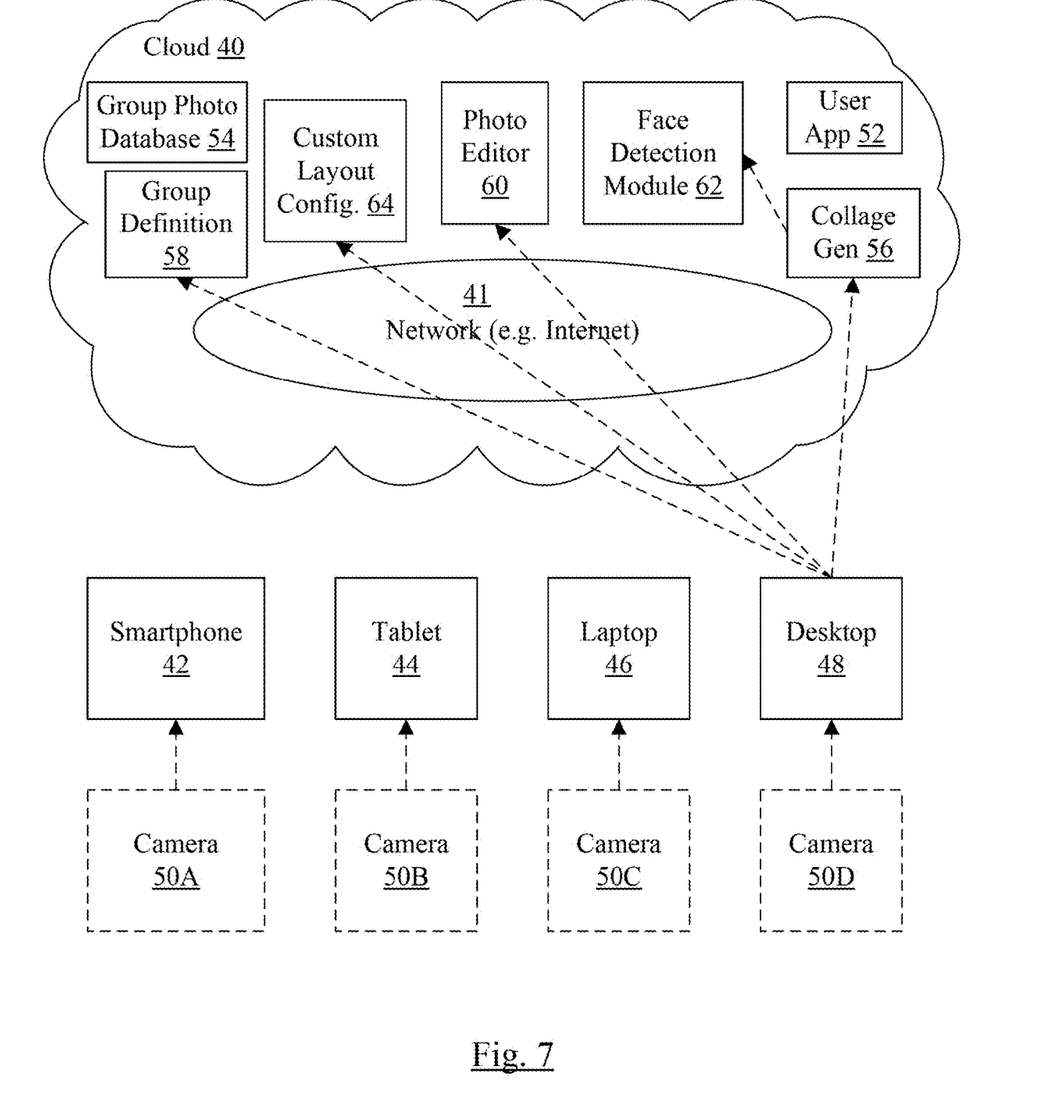
FIG. 7 is a block diagram illustrating one embodiment of the system for automatic generation of collages, including selected user uploads and execution of application in the cloud.

FIG. 7 is block diagram of the system shown in FIG. 5, in which the selected user may use the desktop computer 48 to define the group and its members (e.g. a roster) and to provide the customization settings for the photo collage, e.g. as discussed with regard to FIG. 4. The group definition may be uploaded to the group definition database 58, and the customization of the photo collage may be uploaded to the custom layout configuration data structure 64. The selected user may execute the photo editor 60 to edit the group photos in the database (e.g. to correct for exposure and the like) and to edit the automatically generated head shots to correct any errors on review. The selected user may also execute the collage generator 56 to generate the collages. The collage generator 56 may invoke the face detection module 62 as part of automatically generating the head shots and placing the photos to generate the collages. While the selected user uses the desktop computer 48 in this example, the selected user may employ any user device to perform the various operations above, including any of the user devices 42, 44, and/or 46.

Figure 8:
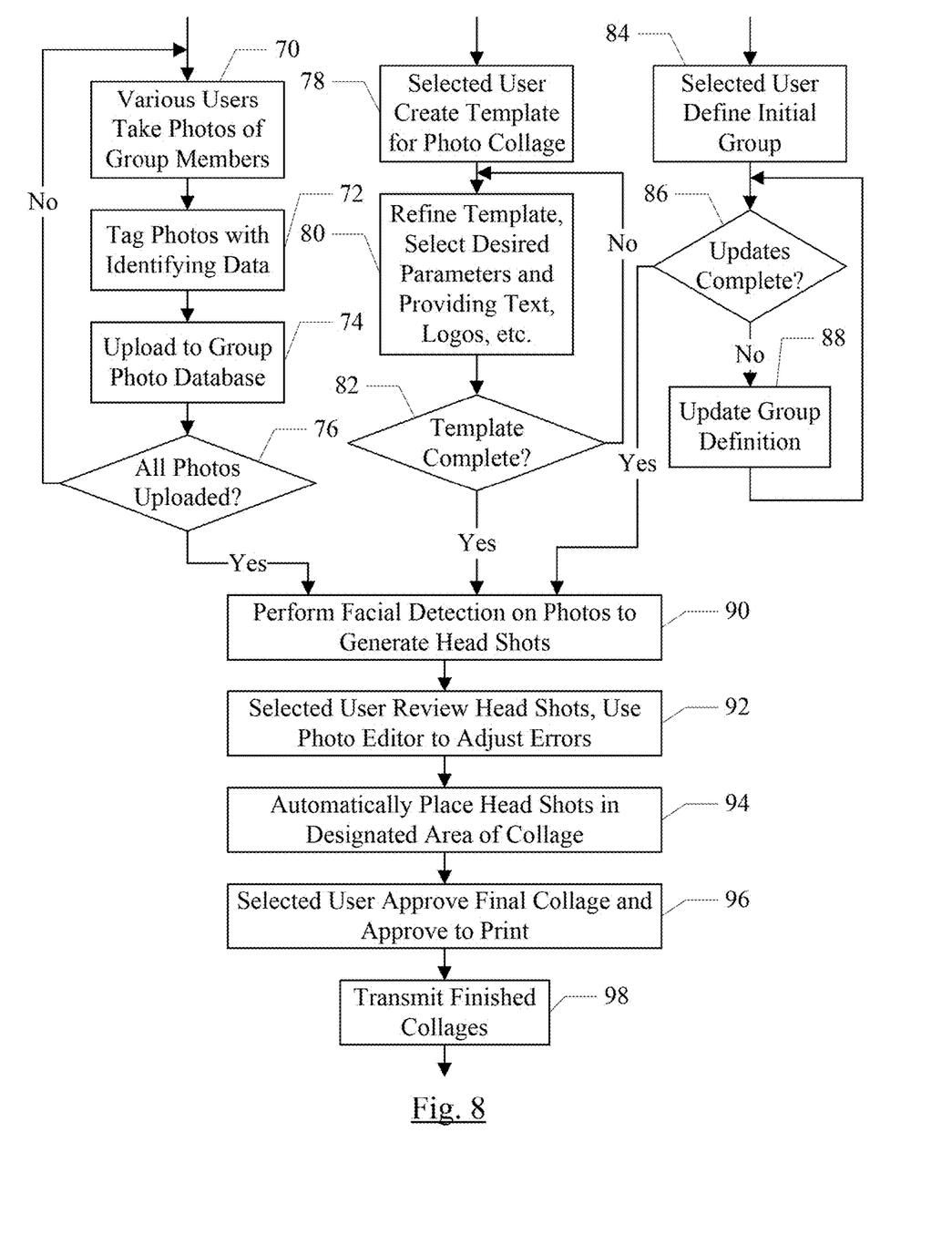
FIG. 8 is a flowchart illustrating one embodiment of various actions in the processor.

FIG. 8 is a flowchart illustrating one embodiment of a simplified view of activities that maybe performed in an embodiment of the automated photo collage process described herein. While the blocks are shown in a particular order for ease of understanding, other orders may be used. Blocks may be performed in parallel, including the parallelism explicitly shown in FIG. 8. The user application 52, the photo editor 60, the face detection module 62, and/or the collage generator 56 may include instructions which, when executed on one or more computer systems, implement the operation shown in FIG. 8. That is, the user application 52, the photo editor 60, the face detection module 62, and/or the collage generator 56 may be configured to implement the operation shown.

Various users may download the user application 52 and may take photos of group members (block 70). The photos may be taken on a camera embedded in the user device, or may be taken with a dedicated camera and downloaded to the user device. In an embodiment, the taking of photos may use other applications on the user's device, if desired. The photos may be body shots, in an embodiment.

The users may tag the photos with identifying data (block 72). Any data may be used. For example, the name of the group member may be added as a tag. In some embodiments, additional data may be included in the one or more tags. For example, if the group is a team, the member's position (or positions) may be included. If the group includes subgroups (e.g. age levels on a swim team), the data may include which subgroup or subgroups the member belongs to. Any desired tags may be added, and may be specified by the template for the photo collage. The tagging may be performed with the user application 52, to match the tags to the data used in the template. Alternatively, other applications may be used to perform the tagging (e.g. a camera application on the user device).

Generally, a tag may be any metadata that is attached to a photo, providing information about the photo. The tag may be associated with the photo so that the tag is transmitted with the photo when the photo is moved from location to location or device to device. A given tag may include a label that identifies the information, as well as a value (e.g. text, number, alphanumeric value, etc.) associated with the label for that photo.

The users may upload the photos to the group photo database 54 (block 74). The upload may be performed by the user application 52, since the user application 52 may have the location of the group photo database 54. Alternatively, a user may transmit the photos directly to the group photo database 54. If all the members photos have been uploaded (decision block 76, "yes" leg), the capture of member photos may be complete. If not (decision block 76, "no" leg), blocks 70, 72, and 74 may be repeated to capture other members. For example, some members may not be available on a day when photos are being taken, and may be photographed on another day.

The selected user may develop the template for the photo collages. Thus, the selected user may create a template (block 78). The user application 52 may be used, for example, to create the template and store the template in the custom layout configuration data structure 64. The selected user may refine the template, select various parameters that may be set for the templates (e.g. as discussed previously with regard to FIG. 4). The selected user may provide custom text, logos, and other graphics or template elements that are desired for the completed collages (block 80). If the user wishes to further modify the template (decision block 82, "no" leg), further refinement may be performed (block 80). If the selected user is satisfied with the template (and perhaps has other group members or individuals affiliated with the group review and approve the template) (decision block 82, "yes" leg), the template definition may be complete.

The selected user may also be tasked with providing the group definition for the photo collages. The selected user may upload an initial group definition (e.g. a roster of members) to the group definition database 58. The group definition may change over time (e.g. members may be added or deleted). If so, the group definition in the group definition database 58 may be updated (decision block 86, "yes" leg and block 88).

At various points, the selected user may generate a set of photo collages for the group members. The collage generator 56 may be used, for example, to generate the photo collages. The collage generator 56 may invoke the face detection module 62 to detect the faces in the body shot photos in the group photo database 54, and may use the detected faces to automatically generate head shots for each member (block 90). For example, the collage generator 56 may automatically crop the head shots out of the body shots, using predetermined criteria such as the aspect ratio and eye alignment in the head shot photos, as previously discussed. In one embodiment, the collage generator 56 may invoke the photo editor 60 to perform the cropping.

The selected user may review the head shots, and may use the photo editor 60 to adjust for any errors in the automatically generated head shots (block 92). Alternatively, the selected user may review the generated collages to detect head shot errors, and block 92 may not be implemented or may be skipped. The collage generator 56 may automatically place the head shots in the designated area or areas of the photo collage, based on the template (block 94). The placement may use the metadata to determine how to arrange the head shots, based on a selected ordering of the head shots. Additionally the collage generator 54 may generate a collage for each member, with that member's body shot in the large photo area of the template. Other custom information such as names, positions, etc. may be added based on the metadata and the template. The selected user may review the collages and make any desired adjustments (block 96). If everything is in order, the selected user may approve the photo collages for print (or digital delivery, if digital delivery is used) (block 98). The collage generator 56 may transmit the finished collages (e.g. to the printer, to digital delivery destinations, etc.). If the photo collages are physically printed, the physical photo collage sheets may be delivered to the group or to the group members.

FIG. 8 may be a simplified view of the operations included in an embodiment of the process. For example, the blocks 90, 92, 94, 96, and 98 need not wait to be performed until all photos are uploaded, the group definition is finalized, and the template is finalized. Instead, the blocks 90, 92, 94, 96, and 98 may be performed more than once during the capture, using the photos available at the time. Additionally, the template may be changed and the blocks 90, 92, 94, 96, and 98 may be performed again, or the group definition database 58 may be updated and the blocks 90, 92, 94, 96, and 98 may be performed again. The head shots automatically generated through face detection may be saved (e.g. in the group photo database 54) and so the head shots may be generated only for the added photos in subsequent runs, in an embodiment. Viewed in another way, blocks 70, 72, 74, and 76 may be independent of other blocks in the flowchart; blocks 78, 80, and 82 may be independent of other blocks in the flowchart; blocks 84, 86, and 88 may be independent of other blocks in the flowchart; and blocks 90, 92, 94, 96, and 98 may be independent of other blocks in the flowchart.

Figure 9:
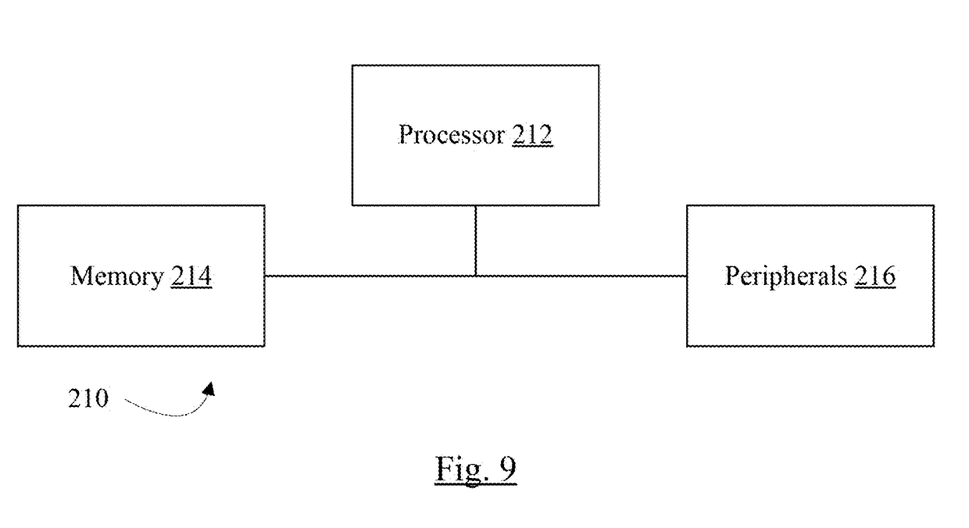
FIG. 9 is a block diagram of one embodiment of a computer system.

Turning now to FIG. 9, a block diagram of one embodiment of an exemplary computer system 210 is shown. In the embodiment of FIG. 9, the computer system 210 includes at least one processor 212, a memory 214, and various peripheral devices 216. The processor 212 is coupled to the memory 214 and the peripheral devices 216.

The processor 212 is configured to execute instructions, including the instructions in the software described herein such as the various components that may be cloud-resident and/or on user devices. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor. The processor 212 may be the CPU (or CPUs, if more than one processor is included) in the system 210. The processor 212 may be a multi-core processor, in some embodiments.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridges may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the various software components described herein), data to be operated upon by the processor 212 during use, etc.

Figure 10:
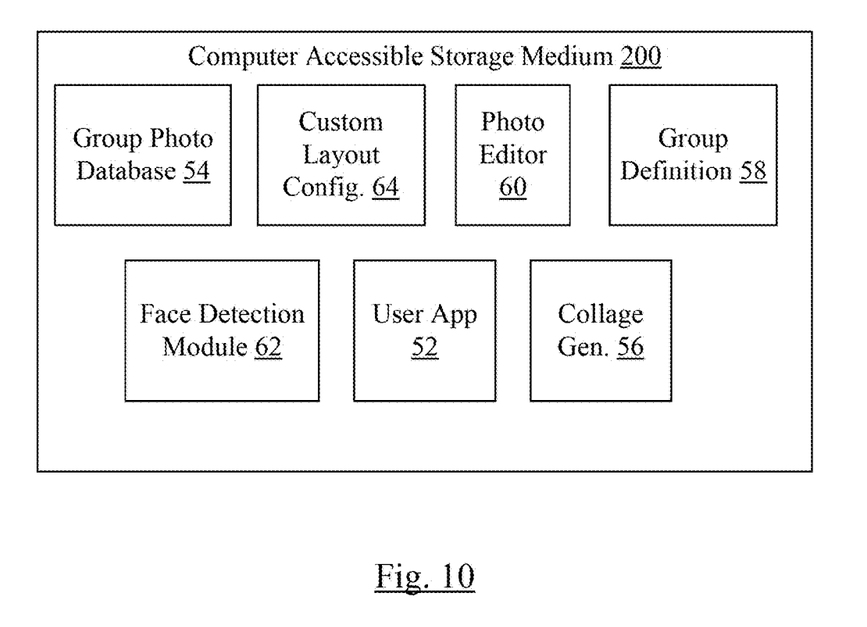
FIG. 10 is a block diagram of one embodiment of a computer accessible storage medium.

Peripheral devices 216 may represent any sort of hardware devices that may be included in the computer system 210 or coupled thereto (e.g. storage devices, optionally including a computer accessible storage medium 200 such as the one shown in FIG. 10), other input/output (I/O) devices such as video hardware, audio hardware, user interface devices, networking hardware, various sensors, etc.). Peripheral devices 216 may further include various peripheral interfaces and/or bridges to various peripheral interfaces such as peripheral component interconnect (PCI), PCI Express (PCIe), universal serial bus (USB), etc. The interfaces may be industry-standard interfaces and/or proprietary interfaces. In some embodiments, the processor 212, the memory controller for the memory 214, and one or more of the peripheral devices and/or interfaces may be integrated into an integrated circuit (e.g. a system on a chip (SOC).

The computer system 210 may be any sort of computer system, including general purpose computer systems such as desktops, laptops, servers, etc. The computer system 210 may be a portable system such as a smart phone, personal digital assistant, tablet, etc. Different computer systems 210 may execute the various components described herein (e.g. computer systems in the cloud 40 may execute cloud-resident components, user devices may execute user applications, etc.).

FIG. 10 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile. The computer accessible storage medium 200 may be on one or more file servers in the cloud 40, in an embodiment.

The computer accessible storage medium 200 in FIG. 10 may store code forming the photo editor 60, the face detection module 62, the collage generator 56, the user application 52, etc. The computer accessible storage medium 200 may still further store one or more data structures such as the group photo database 54, the group definition database 58, the custom layout configuration data structure 64, etc. The photo editor 60, the face detection module 62, the collage generator 56, and the user application 52 may comprise instructions which, when executed, implement the operation described above for these components.

Numerous variations and modifications will become apparent to those skilled in the art once the above disclosure is fully appreciated. It is intended that the following claims be interpreted to embrace all such variations and modifications.

What is claimed is:

1. A non-transitory computer accessible storage medium storing:
   a face detection module which, when executed, applies automated face detection to a plurality of digital photos in a database, wherein the plurality of digital photos were captured by one or more users on one or more user devices and uploaded to the database, wherein the face detection module detects one or more potential faces in the each of the plurality of digital photos;
   a collage generator module which, when executed, automatically generates a plurality of head shots from the plurality of digital photos responsive to the potential faces in the plurality of digital photos detected by the face detection module;
   the collage generator module, when executed, automatically inserts the plurality of digital photos and the plurality of head shots into a plurality of photo collages based on a template for the photo collages, wherein the template is defined by at least one of the one or more users, and wherein the template specifies a spatial arrangement of the plurality of head shots and a given photo of the plurality of digital photos within a given photo collage corresponding to the given photo, wherein the given photo collage includes the given photo and each of the plurality of head shots spatially arranged according to the template; and
   a plurality of instructions which, when executed, transmit the plurality of photo collages for delivery to the one or more users.

2. The non-transitory computer accessible storage medium as recited in claim 1 wherein the plurality of instructions, when executed, transmit the plurality of photo collages digitally.

3. The non-transitory computer accessible storage medium as recited in claim 1 wherein the plurality of instructions, when executed, print the plurality of photo collages for delivery.

4. The non-transitory computer accessible storage medium as recited in claim 1 further storing a module which, when executed, customizes the template with one or more selections of supported settings.

5. The non-transitory computer accessible storage medium as recited in claim 4 wherein the supported settings include one or more settings that control cropping of the plurality of head shots.

6. The non-transitory computer accessible storage medium as recited in claim 5 wherein the one or more settings that control cropping include an aspect ratio for the head shots.

7. The non-transitory computer accessible storage medium as recited in claim 5 wherein the one or more settings that control cropping include an eye level location in the head shots.

8. The non-transitory computer accessible storage medium as recited in claim 4 wherein the supported settings include one or more settings controlling placement of the plurality of head shots.

9. The non-transitory computer accessible storage medium as recited in claim 8 wherein the supported settings further include one or more settings controlling placement of the given photo in the given photo collage, wherein each of the plurality of photo collages includes a different one of the plurality of digital photos.

10. The non-transitory computer accessible storage medium as recited in claim 1 further storing a database which stores the plurality of digital photos.

11. The non-transitory computer accessible storage medium as recited in claim 1 further storing a photo editor which, when executed, accepts user input to correct one or more errors in the plurality of head shots due to misdetection of one or more of the potential faces.

12. A method comprising:
   applying automated face detection to a plurality of digital photos on a computer, wherein the automated face detection automatically detects one or more potential faces in each of the plurality of digital photos in a database, wherein the plurality of digital photos were captured by one or more users on one or more user devices and uploaded to the database;
   responsive to the potential faces detected in the plurality of digital photos, automatically generating a plurality of head shots from the plurality of digital photos;
   automatically inserting the plurality of digital photos and the plurality of head shots into a plurality of photo collages based on a template for the photo collages, wherein the template is defined by at least one of the one or more users, and wherein the template specifies a spatial arrangement of the plurality of head shots and a given photo of the plurality of digital photos within a given photo collage corresponding to the given photo, wherein the given photo collage includes the given photo and each of the plurality of head shots spatially arranged according to the template; and
   transmitting the plurality of photo collages for delivery to the one or more users.

13. The method as recited in claim 12 further comprising:
   reviewing the plurality of head shots to detect one or more errors in at least one potential face of the one or more potential faces detected in the plurality of head shots; and
   correcting the one or more errors using a photo editor.

14. The method as recited in claim 12 wherein transmitting the plurality of photo collages comprises digital transmission of the plurality of photo collages.

15. The method as recited in claim 12 wherein transmitting the plurality of photo collages comprises printing the plurality of photo collages.

16. The method as recited in claim 12 further comprising:
   customizing the template with one or more selections of supported settings, wherein the supported settings include one or more settings that control cropping of the head shots.

17. The method as recited in claim 16 wherein the one or more settings that control cropping include an aspect ratio for the head shots.

18. The method as recited in claim 16 wherein the one or more settings that control cropping include an eye level location in the head shots.

19. The method as recited in claim 12 further comprising:
   customizing the template with one or more selections of supported settings, wherein the supported settings include one or more settings controlling placement of the plurality of head shots.

20. The method as recited in claim 19 wherein the supported settings further include one or more settings controlling placement of the given photo in the given photo collage, wherein each of the plurality of photo collages includes a different one of the plurality of digital photos.

* * * * *